(12) United States Patent
Picard, Jr.

(10) Patent No.: US 7,645,935 B1
(45) Date of Patent: Jan. 12, 2010

(54) OUTLET ASSEMBLY

(75) Inventor: Richard R. Picard, Jr., West Hartford, CT (US)

(73) Assignee: The Wiremold Company, West Hartford, CT (US)

( * ) Notice: Subject to any disclaimer, the term of this patent is extended or adjusted under 35 U.S.C. 154(b) by 0 days.

(21) Appl. No.: 12/195,776

(22) Filed: Aug. 21, 2008

Related U.S. Application Data

(60) Provisional application No. 60/957,344, filed on Aug. 22, 2007.

(51) Int. Cl.
*H02B 1/40* (2006.01)

(52) U.S. Cl. .......................... 174/50; 174/64; 174/72 A; 439/211

(58) Field of Classification Search ................... 174/50, 174/64, 72 A, 24, 21 R, 68.1, 96, 68.3, 97; 439/211, 207
See application file for complete search history.

(56) References Cited

U.S. PATENT DOCUMENTS

| | | | | |
|---|---|---|---|---|
| 2,261,857 | A * | 11/1941 | Novak et al. | 174/72 B |
| 6,364,678 | B1 * | 4/2002 | Hellwig et al. | 439/211 |
| 7,022,912 | B1 * | 4/2006 | Kilburn | 174/50 |
| 7,183,483 | B1 * | 2/2007 | Anderson et al. | 174/50 |
| 7,390,977 | B2 * | 6/2008 | Hill | 174/480 |
| 7,462,779 | B2 * | 12/2008 | Caveney et al. | 174/68.1 |

* cited by examiner

*Primary Examiner*—Gary F. Paumen
(74) *Attorney, Agent, or Firm*—McCormick, Paulding & Huber LLP

(57) ABSTRACT

An outlet assembly installed over an existing device box and wiring to provide an integrated appearance for a new low voltage installation alongside the existing device box, without requiring disturbance of the existing device box or wiring.

20 Claims, 4 Drawing Sheets

OUTLET ASSEMBLY

CROSS REFERENCE TO RELATED APPLICATIONS

This application is entitled to the benefit of and incorporates by reference essential subject matter disclosed in Provisional Patent Application Ser. No. 60/957,344 filed on Aug. 22, 2007.

FIELD OF THE INVENTION

The present invention relates to electrical power and low voltage outlets and, more particularly, to mounting thereof.

BACKGROUND OF THE INVENTION

Electrical power and data connectors and receptacles are used in residential, commercial, and industrial settings. Particularly in commercial and industrial settings, wiring or cables leading to a wall-mounted electrical receptacle are typically routed through a raceway also mounted to the wall. The raceway conceals and protects the wiring or cables.

When an additional receptacle needs to be mounted near an existing device box, using a separate raceway to conceal additional wiring, results in an unsightly appearance. On the other hand, the existing raceway may not accommodate the additional wiring.

Even if the additional wiring can be accommodated in the existing raceway, routing the additional wiring through the existing raceway will disturb the existing wiring, contrary to the raceway purpose of protecting the wiring. Furthermore, data wiring should be separated from high voltage cables. Therefore, there is a need for improvement in installation of additional wiring and connectors near existing wiring and connectors.

BRIEF SUMMARY OF THE INVENTION

According to the present invention, an outlet assembly is mounted over an existing device box that is connected to existing wiring. The outlet assembly thereby permits installation of additional wiring and connectors near existing wiring and connectors with an attractive appearance, and without disturbing the existing wiring.

The outlet assembly comprises a sidecar enclosure, a faceplate, and a second raceway, each adapted for mounting to an existing device box and raceway. The sidecar enclosure houses at least one low voltage device. The sidecar enclosure is attached to the existing device box or to the wall. The second raceway is attached to the wall or to the existing raceway. The second raceway includes a body having a front panel with two sidewalls extending therefrom. In one embodiment, the second raceway includes at least one divider disposed between the two sidewalls defining at least first and second wireways such that the first wireway houses cables passing to the sidecar enclosure and the second wireway houses the existing raceway. In another embodiment, the second raceway includes a back panel to provide enclosed second raceway. The back panel fits against the wall.

These and other objects, features and advantages of the present invention will become apparent in light of the detailed description of the best mode embodiment thereof, as illustrated in the accompanying drawings.

DETAILED DESCRIPTION OF PREFERRED EMBODIMENTS

Figure 1:
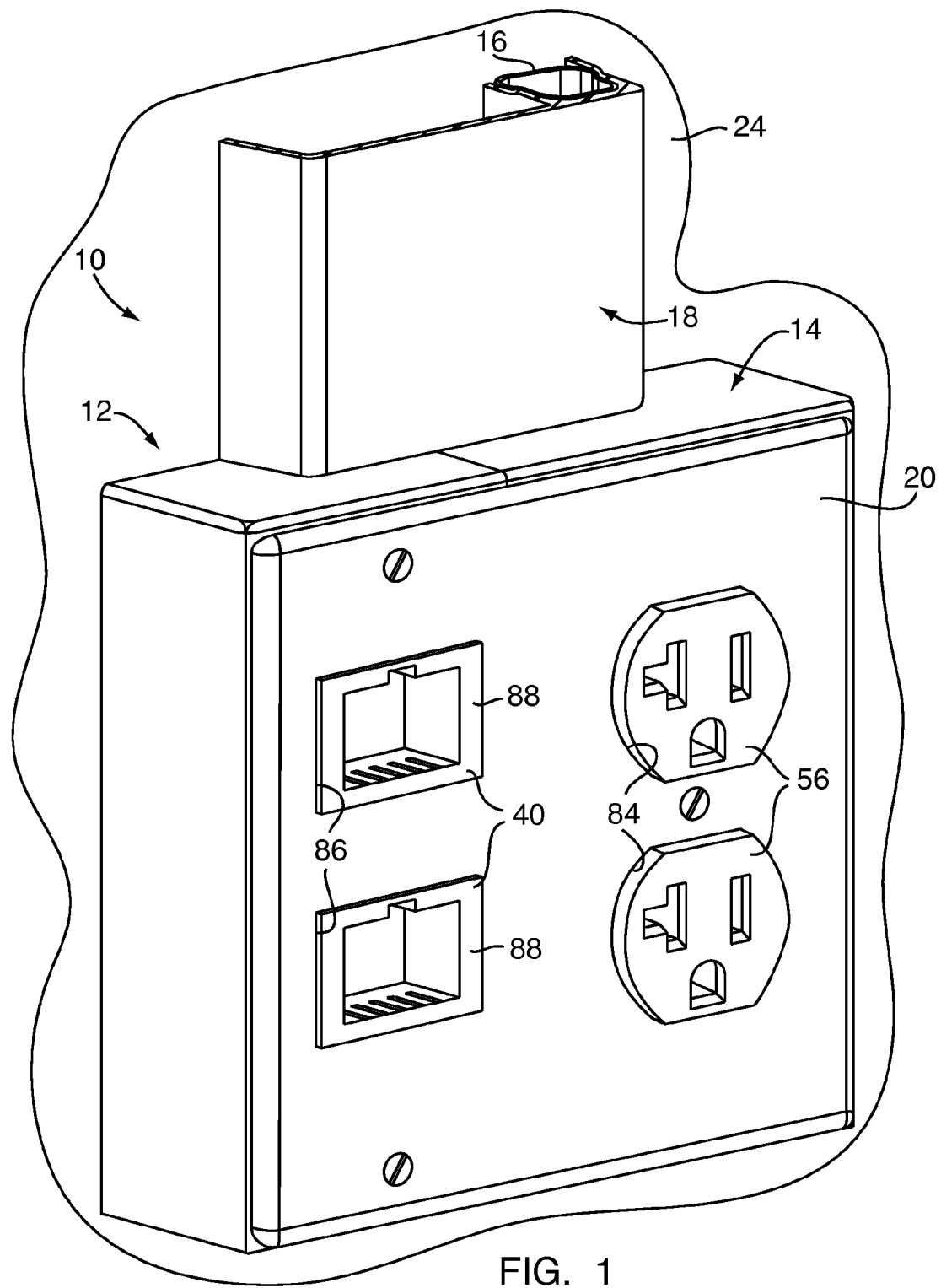
FIG. 1 is a perspective view of an outlet assembly according to an embodiment of the present invention.

Referring to FIG. 1, an outlet assembly 10 includes a sidecar enclosure 12 disposed substantially adjacent to an existing device box 14. The outlet assembly 10 further includes an existing raceway 16 and a second raceway 18 fitting over the existing raceway 16. The outlet assembly 10 also includes a faceplate 20 extending over the sidecar enclosure 12 and the existing device box 14. The outlet assembly 10 is mounted on a surface, such as a wall 24.

Figure 2:
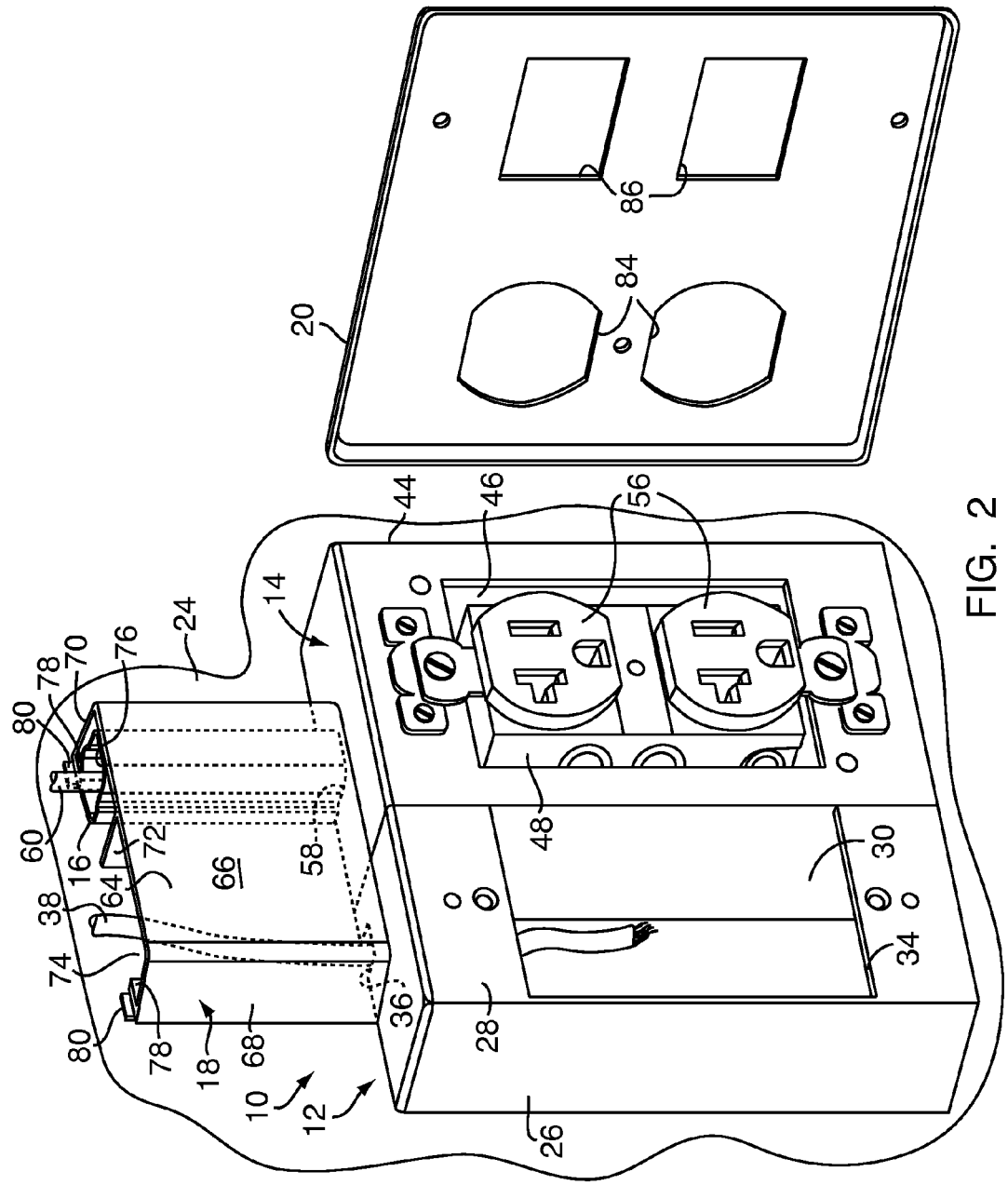
FIG. 2 is a perspective view of an outlet assembly with a faceplate removed according to another embodiment of the present invention.
Figure 3:
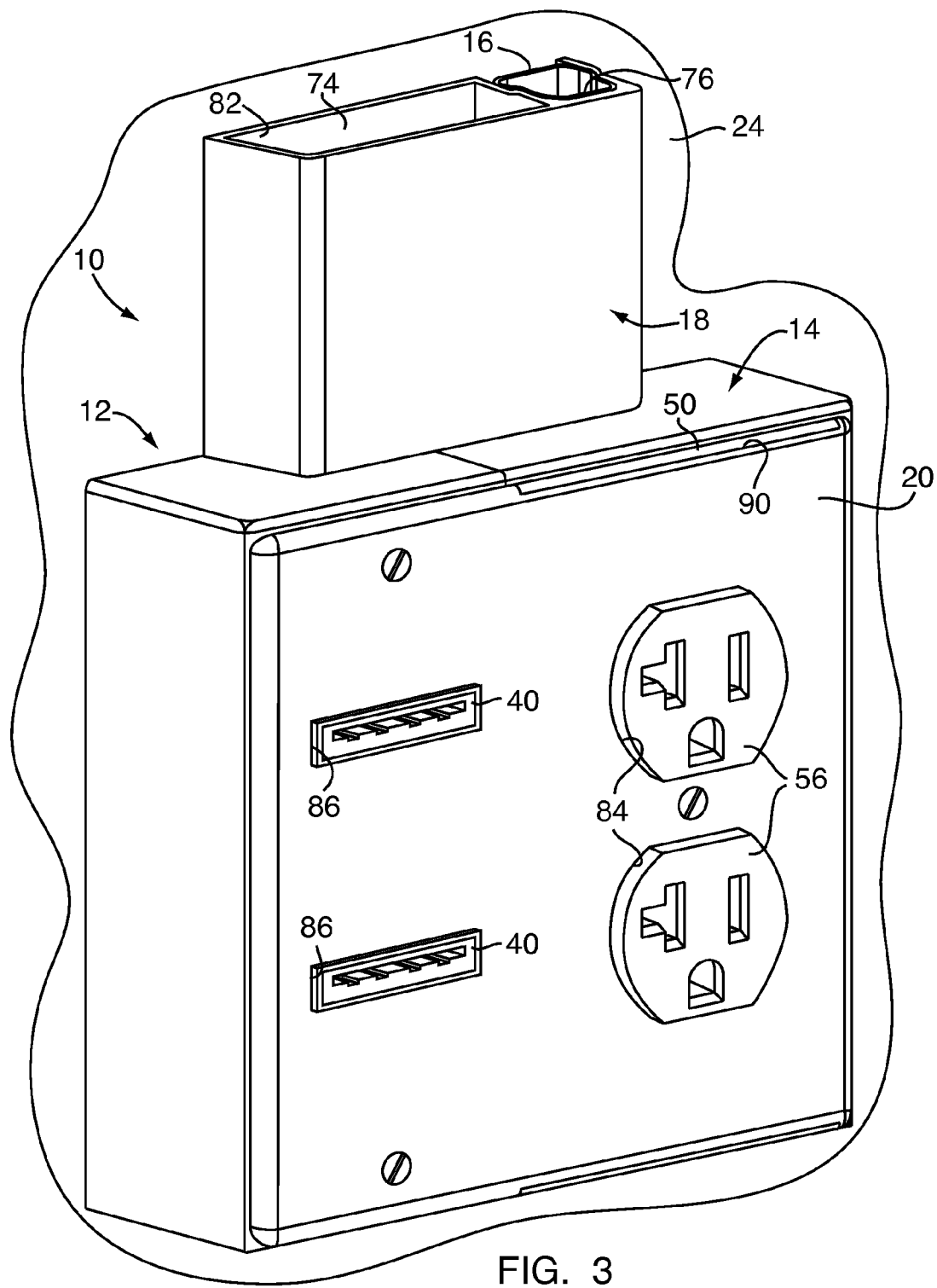
FIG. 3 is a perspective view of an alternate embodiment of the outlet assembly.

Referring to FIG. 2, the sidecar enclosure 12 includes a sidecar box 26 having a front face 28, as well as a sidecar inner chamber 30 and openings 34, 36 formed therein. The inner chamber opening 34 is formed in the front face 28 of the sidecar box 26 and provides access to the sidecar inner chamber 30. The sidecar cable opening 36 receives wires or cables 38 passing through the second raceway 18. The sidecar inner chamber 30 is dimensioned to receive at least one low voltage device 40, shown in FIGS. 1 and 3. The sidecar enclosure 12 can accommodate various types of low voltage devices. For example, the low voltage devices can be any type of voice, audio, data, and/or communication connection, such as, but not limited to, RJ 45 or RJ 11 connector, USB port, any type of phone, cable, data, and/or audio connection. FIGS. 1 and 3 show only several of possible embodiments of the present invention. The sidecar enclosure 12 is attached to the wall 24, in one embodiment, and to the existing device box 14, in another embodiment.

Figure 4:
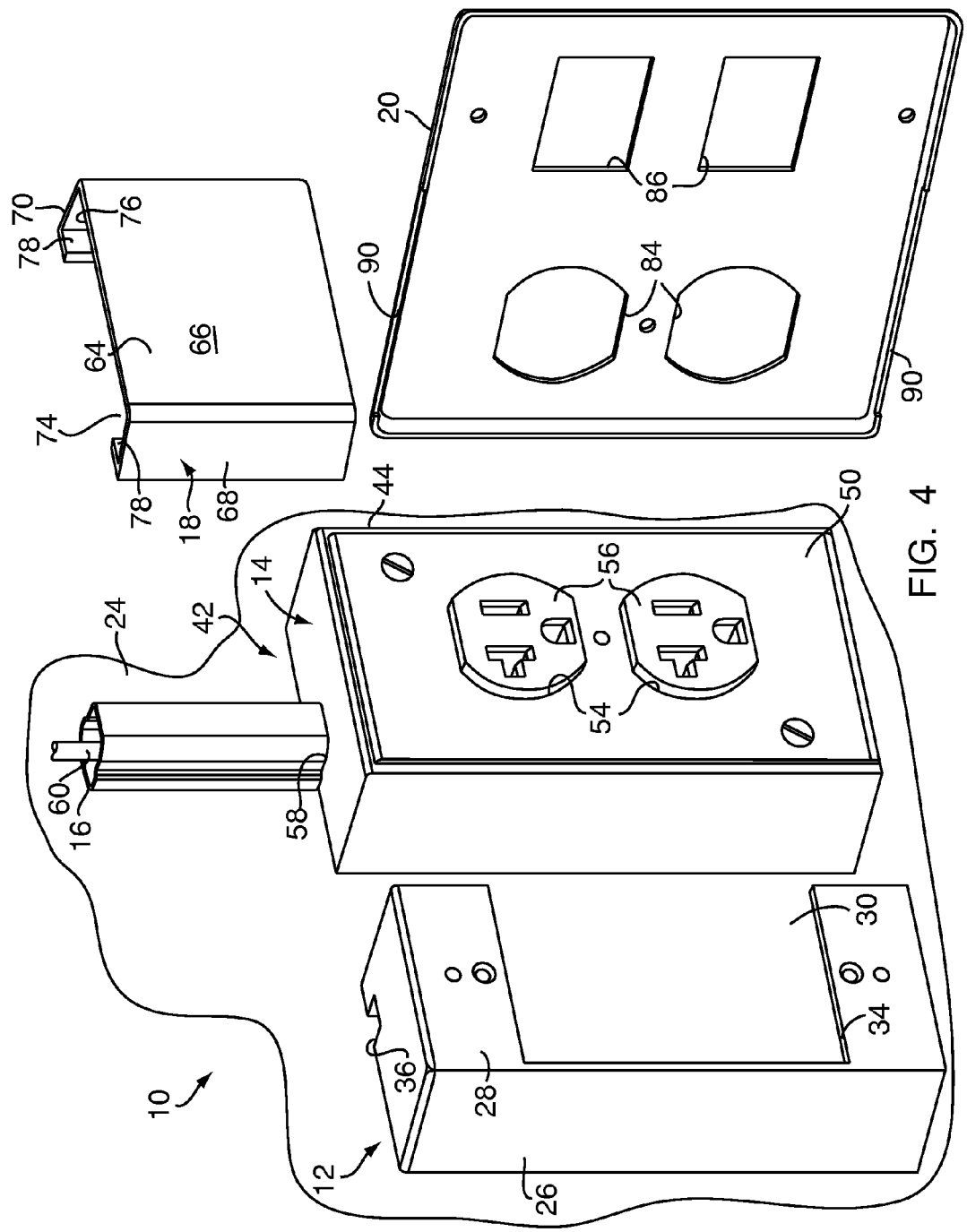
FIG. 4 is an exploded perspective view of another alternate embodiment of the outlet assembly including an existing installation.

Referring to FIG. 4, the existing installation 42 includes the existing device box 14 and the existing raceway 16. The existing device box 14 includes an existing device box body 44 having an existing inner chamber 46 formed therein to house an electrical device 48, as seen in FIG. 2. The existing device box 14 also includes a cover 50 having openings 54 for allowing electrical receptacle outlets 56 of the electrical device 48 to extend therethough, as shown in FIG. 4. The existing device box body 44 also includes an existing cable opening 58 to allow existing cables 60 to pass therethrough. The electrical receptacle outlet 56 is, for example, a 125V 15 A straight blade duplex receptacle, for receiving electrical plugs.

Referring to FIG. 2, the second raceway 18 includes a second raceway body 64 having a front panel 66 with a pair of opposing sidewalls 68, 70 extending therefrom and a divider 72 disposed between the sidewalls 68, 70. The raceway front panel 66, the sidewall 68, and the divider 72 define a first wireway 74. The raceway front panel 66, the sidewall 70, and the divider 72 define a second wireway 76. The second raceway 18 fits over the existing raceway 16. In one embodiment, the second raceway 18 snaps onto the existing raceway 16, as shown in FIG. 1, wherein the divider 72 and the sidewall 70 may be contoured to facilitate the attachment. In another embodiment, each of the sidewalls 68, 70 terminates in a return wall 78, as shown in FIG. 2. Each return wall 78 carries an adhesive pad 80 by which the second raceway 18 is mounted to the wall 24. In a further embodiment, the second raceway 18 may be attached to the existing raceway 16 or other components by any type of a fastener, including, but not limited to, screws or bolts. However, other methods of attachment of the second raceway 18 are available and would be within the scope of one of ordinary skill in the art. In another embodiment, shown in FIG. 4, the divider 72 may be omitted since the existing wiring 60 is disposed in the existing raceway 16 and does not need to be further segregated. In yet another embodiment, the second raceway includes a back panel 82, as shown in FIG. 3 to provide fully enclosed first wireway 74. The back panel fits against the wall. In this embodiment, high voltage wiring can also pass through the first wireway 74.

Referring to FIGS. 2 and 4, the faceplate 20 includes faceplate electrical openings 84 for accommodating existing device box outlets 56 housed in the existing device box 14. The faceplate 20 also includes faceplate low voltage openings 86 for accommodating low voltage receptacle outlets 88 housed in the sidecar enclosure 12.

The faceplate 20 can be of uniform thickness, as shown in FIGS. 1 and 2, if the existing cover 50 is removed prior to attachment of the faceplate 20. Alternatively, as shown in FIGS. 3 and 4, to accommodate the existing cover 50 of the existing device box 14, the faceplate 20 can have a reduced-thickness portion 90. The faceplate 20 is attached to the sidecar enclosure 12 and the existing device box 14 by fasteners or by any other means which would be within the scope of one of ordinary skill in the art.

In operation, as shown in FIGS. 1 and 4, the sidecar enclosure 12 is mounted substantially adjacently to the existing installation 42 to accommodate at least one low voltage device. The second raceway 18 is assembled to either the wall 24, as shown in FIG. 2, or the exiting raceway 16, as shown in FIG. 1, or other components, such that the first wireway 74 is substantially in register with the cable opening 36 of the sidecar enclosure 12 and the second wireway 76 fits over the existing raceway 16. Thus, the wires or cables 38 passing through the first wireway 74 also pass through the sidecar cable opening 36 into the sidecar enclosure 12. The existing wires or cables 60 remain undisturbed within the existing raceway 16. The faceplate 20 is then attached to the existing device box 14 and the sidecar enclosure 12 to provide a uniform appearance and allow access to the low voltage and electrical devices.

One advantage of the present invention is that the second raceway 18 separates new low voltage wiring 38 from existing wiring 60.

Another advantage of the present invention is that the installation results in an integrated appearance.

A further advantage of the present invention is that a technician can install new low voltage wiring 38 alongside an existing power receptacle 14 without disturbing existing high voltage wiring 60.

Although this invention has been shown and described with respect to the detailed embodiments thereof, it will be understood by those skilled in the art that various changes in form and detail thereof may be made without departing from the spirit and the scope of the invention.

What is claimed is:

1. An outlet assembly for installation onto a wall in conjunction with an existing device box and existing raceway, the assembly comprising:
    a sidecar enclosure for placement substantially adjacent to the existing device box; and
    a second raceway for fitting over the existing raceway and for housing cables passing to the sidecar enclosure;
    wherein the sidecar enclosure is attached to the existing device box.

2. The assembly according to claim 1, wherein the sidecar enclosure houses at least one low voltage device.

3. The assembly according to claim 2, wherein the at least one low voltage device is a data connector.

4. The assembly according to claim 2, wherein the at least one low voltage device is a USB port.

5. The assembly according to claim 2, wherein the at least one low voltage device facilitates audio connection.

6. The assembly according to claim 2, wherein the at least one low voltage device facilitates cable connection.

7. The assembly according to claim 1, wherein the second raceway is attached to the wall.

8. The assembly according to claim 1, further comprising a faceplate adapted to cover the sidecar enclosure and the existing receptacle.

9. The assembly according to claim 8, wherein the faceplate is of uniform thickness.

10. The assembly according to claim 8, wherein the faceplate has varying thickness to accommodate a cover of the existing device box.

11. An outlet assembly for installation onto a wall in conjunction with an existing device box and existing raceway, the assembly comprising:
    a sidecar enclosure for placement substantially adjacent to the existing device box; and
    a second raceway for fitting over the existing raceway and for housing cables passing to the sidecar enclosure;
    wherein the second raceway is attached to the existing raceway.

12. The assembly according to claim 11, wherein the sidecar enclosure is attached to the wall.

13. The assembly according to claim 11, wherein the second raceway snaps onto the existing raceway.

14. The assembly according to claim 11, wherein the sidecar enclosure houses at least one low voltage device.

15. The assembly according to claim 11, further comprising a faceplate adapted to cover the sidecar enclosure and the existing receptacle.

16. An outlet assembly for installation onto a wall in conjunction with an existing device box and existing raceway, the assembly comprising:
    a sidecar enclosure for placement substantially adjacent to the existing device box; and
    a second raceway for fitting over the existing raceway and for housing cables passing to the sidecar enclosure;
    wherein the second raceway includes a body having a front panel with two sidewalls extending therefrom and at least one divider disposed between the two sidewalls defining at least first and second wireways; and
    wherein the first wireway houses cables passing to the sidecar enclosure and the second wireway houses the existing raceway.

17. The assembly according to claim 16, wherein the divider and at least one of the sidewalls is contoured to facilitate attachment of second raceway to the existing raceway.

18. The assembly according to claim 16, wherein the sidecar enclosure houses at least one low voltage device.

19. The assembly according to claim 16, further comprising a faceplate adapted to cover the sidecar enclosure and the existing receptacle.

20. A raceway comprising:
    a body having a front panel with two sidewalls extending therefrom and at least one divider disposed between the two sidewalls defining at least first and second wireways;
    wherein the first wireway houses cables passing to a low voltage receptacle and the second wireway fits over an existing raceway.

* * * * *